United States Patent [19]
Brayboy

[11] Patent Number: 5,817,241
[45] Date of Patent: Oct. 6, 1998

[54] METHOD FOR SEPARATING HOG SEWAGE INTO LIQUID AND SOLID COMPONENTS

[76] Inventor: Lois F. Brayboy, 2005 Hodge Rd., Knightdale, N.C. 27545

[21] Appl. No.: 908,059

[22] Filed: Aug. 11, 1997

[51] Int. Cl.⁶ .............................. B01D 37/00; A01K 1/01
[52] U.S. Cl. ......................... 210/800; 210/783; 210/400; 119/451
[58] Field of Search .................................. 210/800, 783, 210/400; 119/451

[56] References Cited

U.S. PATENT DOCUMENTS

| | | | |
|---|---|---|---|
| 3,950,562 | 4/1976 | Senior | 210/400 |
| 3,971,720 | 7/1976 | Swanson et al. | 210/196 |
| 4,018,599 | 4/1977 | Seckler et al. | |
| 4,060,054 | 11/1977 | Blair | |
| 5,545,560 | 8/1996 | Chang | 210/783 |
| 5,628,912 | 5/1997 | Nesseth | 210/768 |
| 5,666,905 | 9/1997 | Mackin et al. | 119/448 |

*Primary Examiner*—Robert Popovics
*Attorney, Agent, or Firm*—Rhodes, Coats, & Bennett, LLP

[57] ABSTRACT

The present invention entails a hog sewage separator for separating solids within the hog sewage from the water or liquid therein. The sewage separator includes a conveyor having a perforated solids retainer extending thereover so as to define an open channel through which the separated solids are conveyed by the conveyor. Hog sewage directed into the separator unit is separated as the water or liquid flows through the perforated retainer and spills over into an underlying lagoon. The separated solids are conveyed by the separator to a holding tank.

5 Claims, 4 Drawing Sheets

5,817,241

METHOD FOR SEPARATING HOG SEWAGE INTO LIQUID AND SOLID COMPONENTS

FIELD OF THE INVENTION

The present invention relates to hog waste handling and to processes for separating a hog waste stream into solid and liquid component streams, and more particularly to a system and process for separating solid and liquid hog waste components while conveying the liquid stream to a waste water lagoon and the solid waste stream to an isolated solids holding tank.

BACKGROUND OF THE INVENTION

While the steady growth in demand for pork and pork related products has had a positive impact on the national and numerous local economies over the past decade, the corresponding growth of commercial hog production facilities has led to significant political and public resistance to their operation mainly as a result of hog waste concerns. Specifically, as swine production capacity has risen over the past decade, so has the volume of hog sewage that must be safely contained and treated.

Current methods of handling hog waste by many producers typically involve the use of hog waste lagoons. Raw hog waste, which is comprised generally of a solid component and a liquid component, is pumped into these lagoons and confined, allowing solar evaporation to slowly remove the volatile liquid component of the waste slurry. However, over time, the pathogen laden solids contained in the waste slurry begins to break down and liquefy, producing a large volume of pathogen rich liquid which constitutes an environmental hazard that is costly to treat. It is common practice to remove the resulting liquefied solids from the lagoon and to spray or discharge the same on agricultural fields. Obviously, as the liquefied solids retain significant bacteria or other pathogens then the spraying or discharge of such onto agricultural land poses a serious health and safety risk to the public. In addition, the discharging of such waste into the ecological environment such as rivers, tributaries, and streams, pose immediate threats to drinking water, wildlife, vegetation and food sources.

Thus, there is an urgent need for a method whereby the pathogen rich solid waste component of raw hog sewage can be isolated and treated using established, economical solid waste treatment techniques. Once effectively treated, the resulting hog waste solid by-products can be safely utilized as a fertilizing material, hence providing economic as well as environmental benefits.

SUMMARY OF THE INVENTION

The present invention entails a method and apparatus for separating raw hog waste sewage into a generally liquid component and a generally solid component, and for physically isolating the two components once separation is accomplished.

In particular, the present invention includes a hog waste separator which employs an elongated conveyor belt assembly for receiving, separating and conveying waste material. A perforated retainer or screen is disposed over the conveyor assembly and, in conjunction with the conveyor belt, defines a solid waste conveying channel. It is contemplated that the separator would be disposed over a waste lagoon and would be adapted to receive a stream of hog waste sewage from an adjacent swine house. Upon receiving the hog waste sewage stream, the separator would permit liquid waste drainage into the lagoon below, while retaining and confining the waste solids and conveying such solids to a holding or treating tank.

It is, therefore, an object of the invention to provide a method and apparatus for receiving and separating a stream of raw hog waste sewage into a generally liquid waste component stream and a generally solid waste component stream.

It is also an object of the invention to provide a method and apparatus for physically isolating the liquid waste component from the solid waste component.

Other objects and advantages of the present invention will become apparent and obvious from a study of the following description and the accompanying drawings which are merely illustrative of such invention.

DETAILED DESCRIPTION OF THE INVENTION

The present invention entails a method and apparatus for separating a stream of raw hog waste into a liquid component stream and a solids component stream, while directing each of the separated waste streams to physically isolated containment areas.

Figure 3:
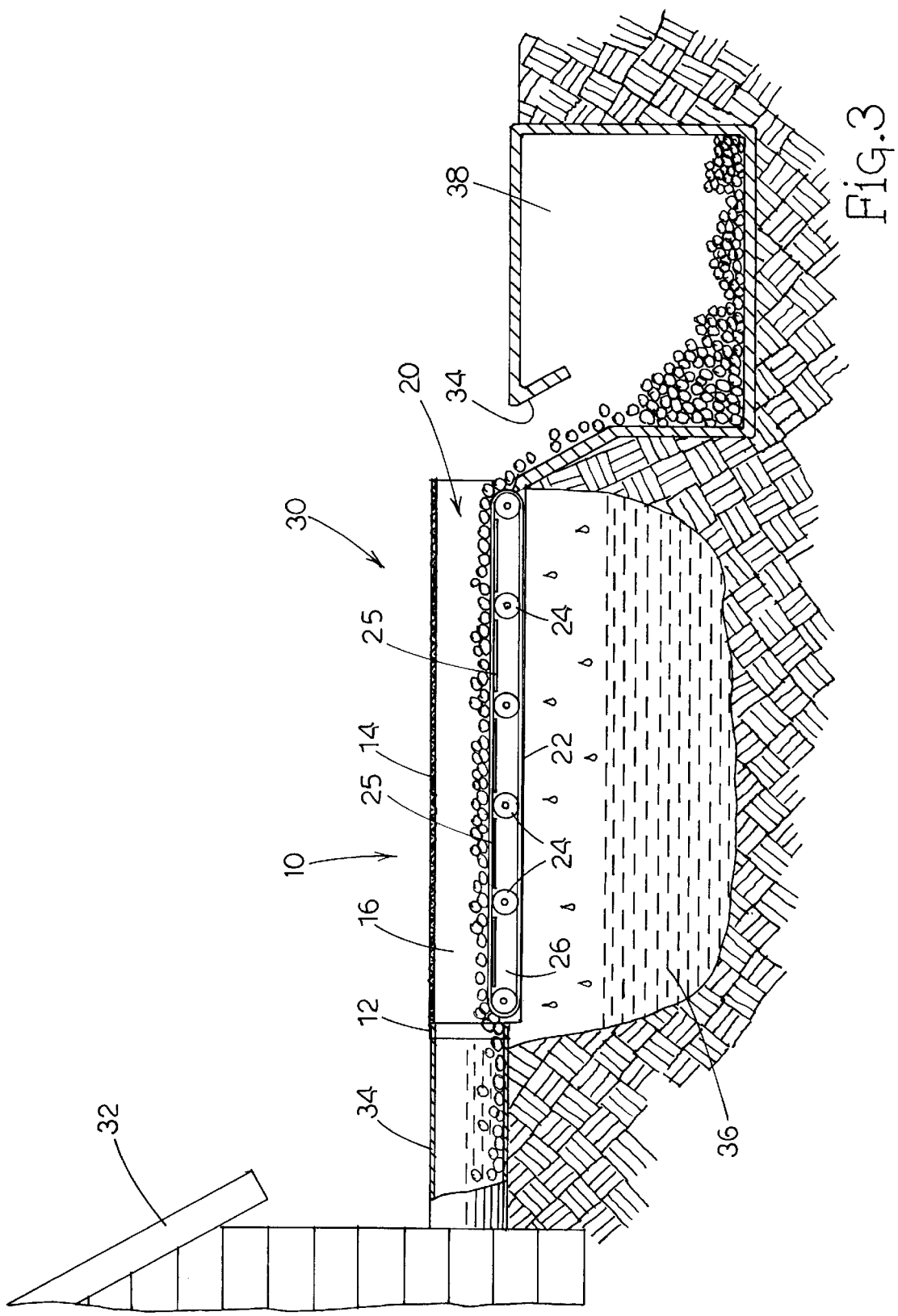
FIG. 3 is a sectional view of a typical hog waste handling area showing the relative positioning of the hog waste separator of the present invention with respect to the waste water lagoon.
Figure 4:
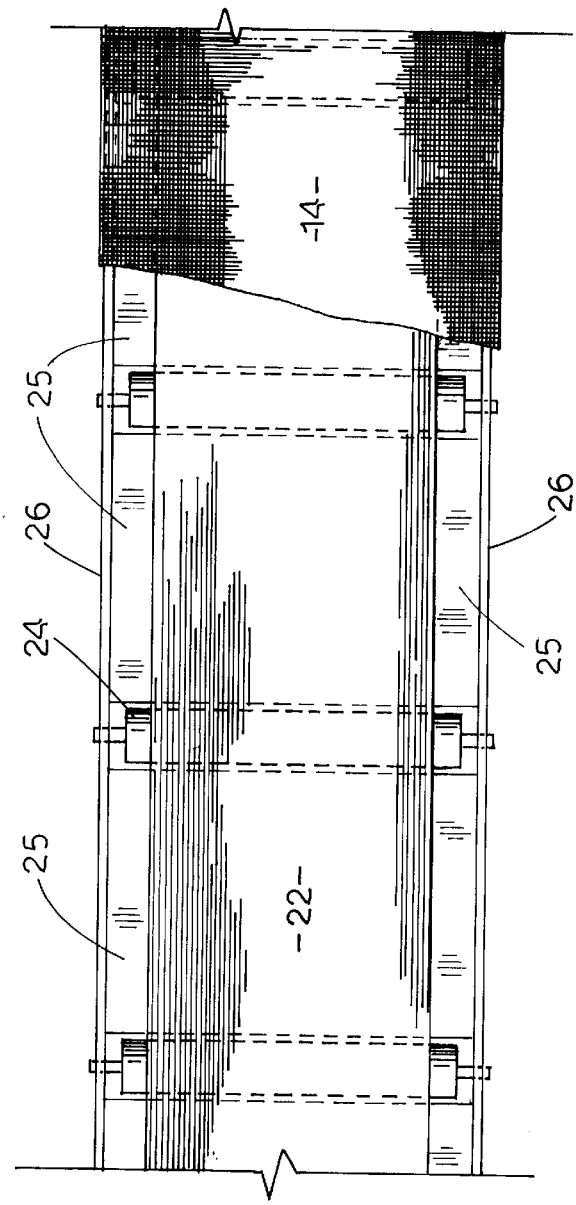
FIG. 4 is a top, sectional view of the hog waste separator of the present invention.

With particular reference to FIG. 3, there is shown therein a typical hog waste handling area 30 equipped with the waste separator 10 of the present invention. Located in the waste handling area 30 is a swine house 32 from which extends a sewage discharge conduit 34. As will be appreciated by those skilled in the art, hog sewage collected in the swine house 32 is typically directed therefrom through the discharge conduit 34. Discharge conduit 34 is communicatively coupled to the waste separator 10 through an inlet or coupler 12.

Figure 2:
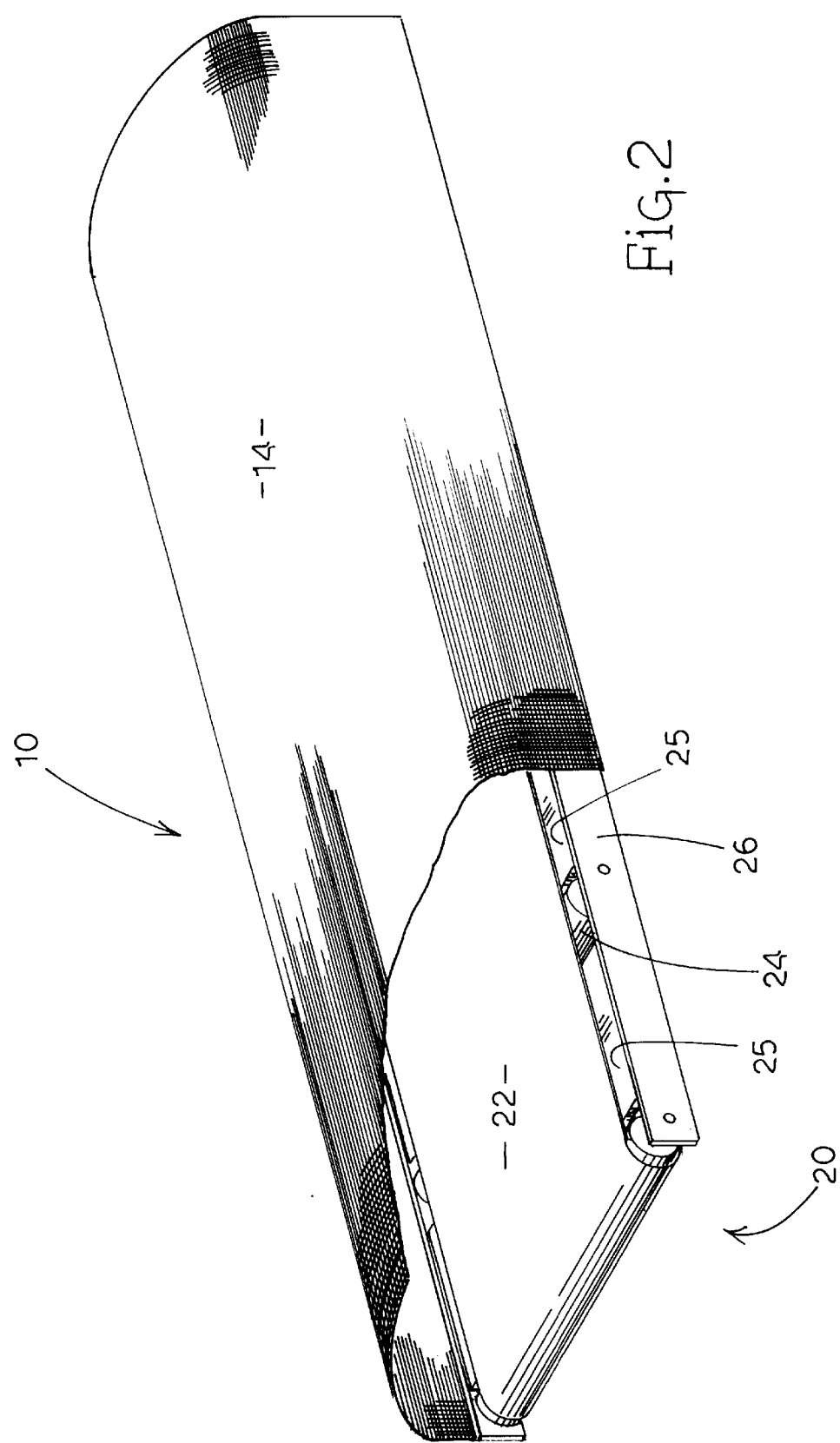
FIG. 2 is a perspective view of the hog waste separator of the present invention.

As shown in FIGS. 2 and 3, the waste separator 10 basically comprises a conveyor assembly 20 and a perforated solids retainer or screen 14 extending over the conveyor assembly 20. As shown in FIGS. 2–5, the conveyor assembly 20 is comprised of a series of rollers 24, longitudinally spaced along the length of the assembly 20, and disposed between a pair of supporting frame members 26. The rollers 24 are adapted to receive and support a continuous loop belt 22, so as to effectively form a moving platform which serves to communicatively couple and transport waste material between the inlet and outlet ends of the conveyor assembly. A series of plates 25 are connected between the frame members 26. Plates 25 are spaced such that they extend between successive rollers 24. See FIGS. 4 and 5. Thus, the plates 25 extend between the frame members 26 and generally lie underneath the upper run of the conveyor belt 22. Accordingly, the plates 25 tend to fill the open spaces below the upper run of the conveyor belt 22 and as such, the plates extend between successive rollers 24 and between the spaced apart frame members 26. Therefore, it is appreciated that the plates 25 function to generally prevent sewage solids from falling through the separator 10. It should be appreciated that the conveyor assembly 20 can be driven by a motor or any other suitable means for propelling the belt 22 and rollers 24.

The frame members 26 are also adapted to receive and support the perforated solids retainer 14 which encloses the conveyor assembly 20 and defines a passageway 16 therethrough. As seen in the drawings, the perforated screen or retainer 14 extends over the conveyor assembly 20. In the embodiment illustrated, the screen 14 extends over only the upper portion of the conveyor assembly as the lower portion of the conveyor assembly and the lower run of the belt 22 remain open. This design should, for the most part, avoid the return of solids to the inlet end of the conveyor assembly.

Disposed adjacent and also communicatively coupled to the outlet end of the conveyor assembly 20 is a solid waste holding tank 38, which is physically isolated from the waste water lagoon 36. Those skilled in the art will appreciate that while the holding tank 38 may be located above or below ground, for the purpose of efficiency the outlet of the discharge conduit 34 and the conveyor assembly 20 should be at an elevation which is above the height of the inlet to the holding tank 38 inlet.

The separator 10 is preferably mounted over a waste lagoon 36 as illustrated in FIG. 3. This can be achieved by utilizing pilings that extend upwardly from the lagoon or the separator 10 can be suspended over the lagoon by various other means. In any event, the separator 10 is typically mounted such that the outlet end portion thereof is operative to direct solids being conveyed by the conveyor assembly 20 to the holding or treating tank 38. In most cases, the location of the conveyor assembly 20 and the holding tank 38 will require a connecting conduit which would extend from the outlet end of the conveyor assembly 20 to the inlet of the holding tank 38. The connecting conduit can be angled such that the solids will flow by gravity from the outlet end of the conveyor assembly 20 into the holding tank. In the alternative, the connecting conduit can be powered and include a material handling device such as a conveyor for conveying the solids from the separator 10 to the holding tank 38.

Figure 1:
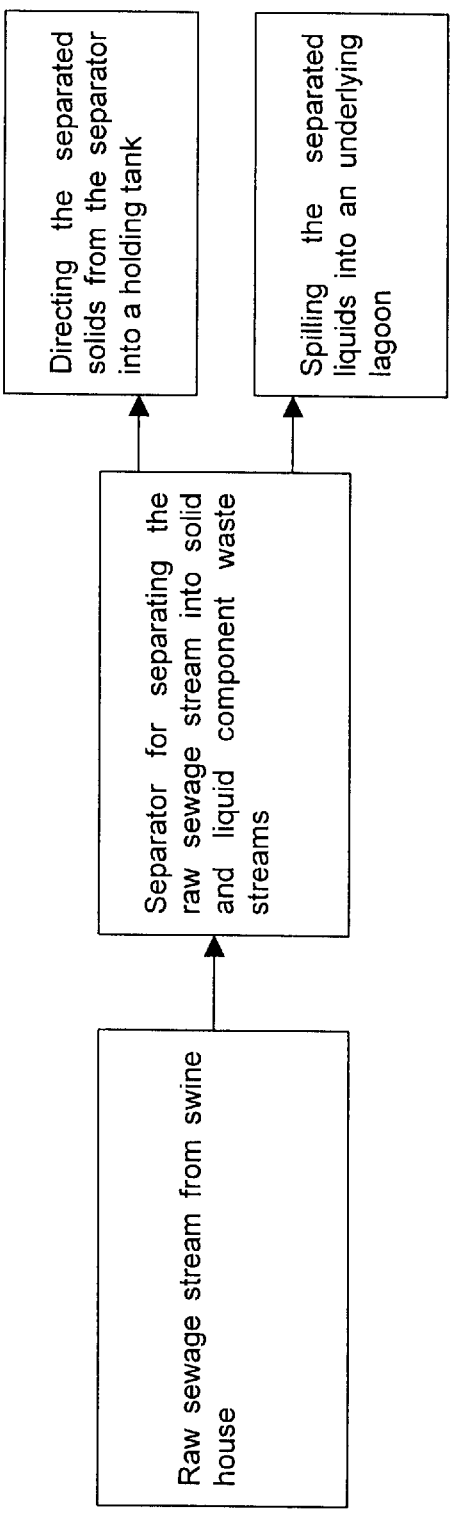
FIG. 1 is a schematic diagram illustrating the basic operation of the hog waste separator of the present invention.
Figure 5:
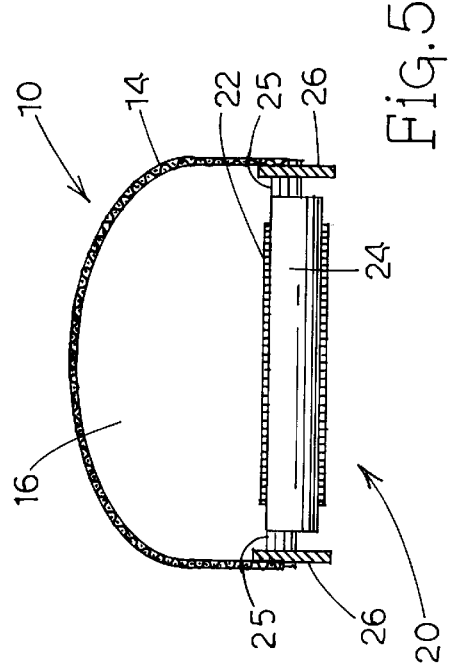
FIG. 5 is a transverse, sectional view of the hog waste separator of the present invention.

As shown in the schematic diagram of FIG. 1, operation of the present invention involves the discharge of a raw hog waste sewage stream from the swine house 32 via the sewage discharge conduit 34. The raw hog waste sewage stream flows through the sewage discharge conduit 34 and is received by the conveyor assembly 20. The raw sewage stream is injected into the separator 10 and onto the conveyor belt 22, and the solids content is effectively confined within the passageway 16 formed by the belt 22 and the perforated solids retainer 14, as illustrated in FIGS. 2, 3 and 5. The belt 22, being disposed about the series of rollers 24, is permitted to move in a direction which generally conveys the waste material from the inlet end of the separator towards the outlet end of waste separator 10. While confined within the passageway 16, agitation of the raw hog waste stream results in a separation of the waste stream into a generally solid component and a generally liquid component. The liquid component is allowed to flow from the separator 10, through the perforated solids retainer 14, and fall into the waste water lagoon 36 below, while the solid components are retained and confined within the passageway 16 formed by the belt 22 and the perforated solids retainer 16. The retained solid components are conveyed by the belt 22 to the outlet of the conveyor assembly 10, whereat the solid components are discharged into, and held by, the solid waste holding tank 38.

While the waste separator 10 can assume a number operational configurations, one common configuration would likely be one that results from the retroactive installation of the separator 10 into an existing hog waste handling area 30. Such a separator configuration would place the elongated conveyor belt assembly 20 adjacent the existing raw sewage discharge conduit 34, and above the existing sewage lagoon 36. The close proximity of the sewage lagoon 36 is necessary in order to catch and contain all liquids draining from the separator 10. The separate, solids waste holding tank 38 can be located near the outlet of the separator assembly 10 and would be physically isolated from the sewage Lagoon 36. In this case, raw hog waste passing through the discharge conduit 34 from a swine house 32 would be received by the conveyor belt assembly 20, separated into solid and liquid components, with the liquid component draining into the sewage lagoon 36 below and the solid component discharging into the solid waste holding tank 38.

The solids held within the waste holding tank can be treated in various conventional ways. It is contemplated that the solids held within the tank 38 would be treated to kill the pathogens associated with the solids. Thereafter, the treated solids would be removed from the tank 38 and transferred to a facility where the solids would be processed into organic fertilizer. Alternatively, the holding tank 38 may assume the form of a digester. As a digester, the holding tank 38 would perform a digestion process on the solids and in the end would produce a relatively dry pathogen-free treated sludge product. Once the solids have been appropriately treated for pathogens, volatile, solids and the like, then the treated solids in the form of a sludge can be safely disposed of such as by spreading the same on agricultural fields.

From the foregoing specification and discussion, it is seen that the present invention performs a separation process that essentially separates the solids of the hog sewage stream from the liquid portion thereof. By doing so, the solids are contained and controlled and are prohibited from being discharged into the lagoon.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A method of separating solid and liquid components of a hog sewage waste stream comprising:

a) receiving the hog sewage stream through an inlet which directs the sewage stream onto a conveyor assembly, said conveyor assembly forming a part of a liquid-water separator that includes a perforated solids retainer that extends over the conveyor assembly and defines a solids conveying channel between the conveyor and said perforated solids retainer;

b) directing the liquid component of the hog sewage stream from the conveyor assembly, while retaining the solid components on the conveyor assembly;

c) conveying and confining the hog sewage solids from the inlet end of the conveyor assembly to the outlet end of the conveyor assembly; and d) discharging the hog sewage solids from the conveyor assembly into a solid waste holding tank.

2. The method of claim 1 wherein the conveyor assembly is positioned over a liquid waste lagoon, allowing the separated liquid component to drain directly into the lagoon.

3. The method of claim 1 wherein the solid waste holding tank is located adjacent to and isolated from the liquid waste lagoon.

4. The method of claim 1 including discharging the hog sewage stream into the separator in such a fashion that a liquid component of the sewage stream is expelled from the separator through the perforated retainer and then spills downwardly into a waste lagoon.

5. The method of claim 4 wherein a portion of the solids contained within the hog sewage is caught by the conveyor assembly and conveyed generally from the inlet end to the outlet end of the conveyor while the solids retainer generally retains the solids about the conveyor assembly and generally prevents the solids being conveyed by the conveyor from spilling into the underlying lagoon.

\* \* \* \* \*